J. A. SHOEMAKER & D. D. JONES.
Nut-Lock.
No. 167,944. Patented Sept. 21, 1875.
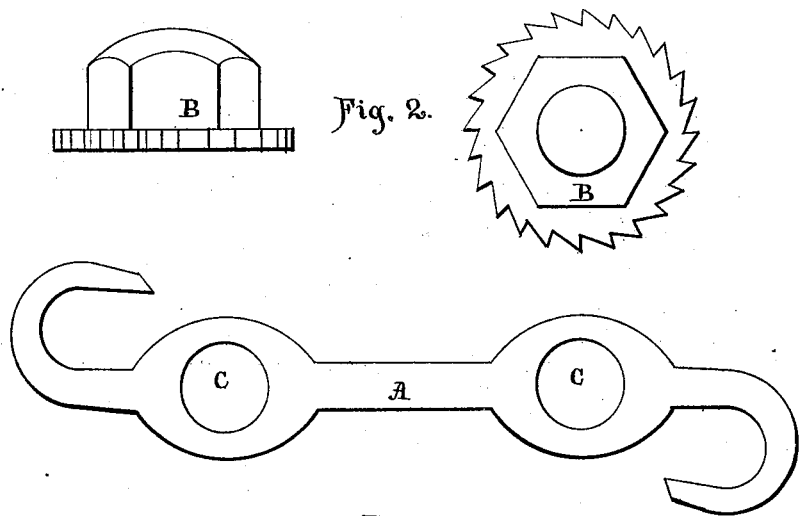
Fig. 2.
Fig. 1.
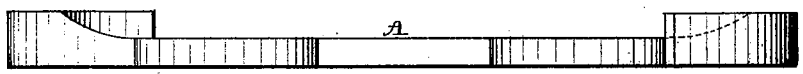
Fig. 3.
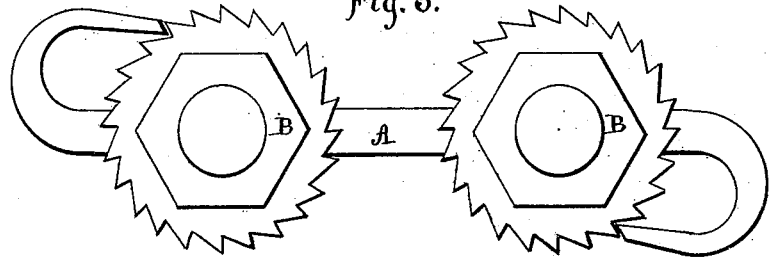
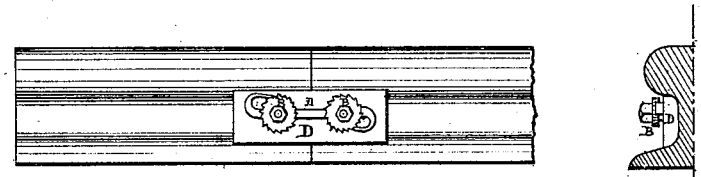
WITNESSES:
T. W. Taylor
H. H. Cattin
INVENTORS:
John A. Shoemaker
David D. Jones

UNITED STATES PATENT OFFICE.

JOHN A. SHOEMAKER AND DAVID D. JONES, OF PITTSBURG; SAID JONES ASSIGNOR TO E. T. VANVOORHIS, OF MONONGAHELA CITY, PA.

IMPROVEMENT IN NUT-LOCKS.

Specification forming part of Letters Patent No. 167,944, dated September 21, 1875; application filed November 14, 1874.

*To all whom it may concern:*

Be it known that we, JOHN A. SHOEMAKER and DAVID D. JONES, both of the city of Pittsburg, in the county of Allegheny and State of Pennsylvania, have invented a certain new and useful Improvement in Nut-Locks, of which the following is a full, clear, and exact description, reference being had to the accompanying drawing, in which—

Figure 1 illustrates our improved spring-fastening plate; Fig. 2, a nut having teeth upon its periphery; and Figs. 3 to 5, views of the application of our improvement.

Our invention relates to that class of nut-locks in which a nut is provided with teeth, and prevented from turning upon its bolt by the engagement of a fixed spring therewith; and it consists substantially in the construction of an independent plate perforated for the reception of several bolts, and formed for engagement with several toothed nuts, whereby the several nuts can be locked upon the bolts by one and the same spring-piece, and said piece be securely held in position by the bolts and by the nuts, as hereinafter more fully set forth.

Referring to the drawings, A is a spring-plate perforated at $c$ $c$ for the reception of the bolts, and constructed with curved spring ends A' A' for interlocking with the nut-teeth, said ends being widened and bent in opposite directions for such purpose. This spring-piece is slipped over the several bolts employed in bolting the fish-bar D to the rails, when used in such instance, and then down upon the said bar, after which the nuts B B, having teeth upon their peripheries or surrounding toothed rings, are screwed down upon the bolts, and the curved spring-ends A' A' sprung into engagement therewith. By this means each bolt holds the spring in position relatively to the other, and thereby effectually locks and prevents the nuts from turning, while at the same time each nut holds the spring-piece securely upon the fish-bar.

Having thus described our invention, what we claim, and desire to secure by Letters Patent, is—

The herein-described independent spring-plate A, provided with perforations $c$ $c$ for the reception of the bolts, and spring-ends A' A' curved and widened for engagement with the nut-teeth, whereby two nuts may be locked upon their respective bolts by one and the same spring-plate, and the said plate be securely held in position by the bolts and nuts, substantially as set forth.

JOHN A. SHOEMAKER.
DAVID D. JONES.

Witnesses:
T. W. TAYLOR,
H. A. CATLIN.